(12) United States Patent
Grubbs

(10) Patent No.: US 8,888,670 B2
(45) Date of Patent: Nov. 18, 2014

(54) APPARATUS AND METHOD UTILIZING A MAGNETIC FORCE TO APPLY A FORCE TO A MATERIAL

(75) Inventor: Christopher Vernon Grubbs, Spanaway, WA (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 13/273,676

(22) Filed: Oct. 14, 2011

(65) Prior Publication Data
US 2013/0091714 A1 Apr. 18, 2013

(51) Int. Cl.
| | | |
|---|---|---|
| B23Q 3/152 | (2006.01) | |
| B25B 27/00 | (2006.01) | |
| B26B 25/00 | (2006.01) | |

(52) U.S. Cl.
CPC ............ B25B 27/0092 (2013.01); B23Q 3/152 (2013.01); B26B 25/005 (2013.01)
USPC .................................... 492/8; 492/13; 492/60

(58) Field of Classification Search
USPC ............ 30/319, 346.54, 306, 292; 74/DIG. 4; 83/575, 374, 698.21; 335/285; 156/272.2, 273.7; 100/210, 917; 492/8, 492/13, 14, 16–19, 22, 28; 7/901; 15/230.11, 23, 27; 601/15; 452/145; 425/298; 294/65.5; 408/76; 401/147, 401/137, 21, 208, 211; D4/122
See application file for complete search history.

(56) References Cited

U.S. PATENT DOCUMENTS

| | | | | | |
|---|---|---|---|---|---|
| 896,484 | A | * | 8/1908 | Thoms | 601/120 |
| 2,648,434 | A | * | 8/1953 | Russell | 209/215 |
| 3,002,149 | A | * | 9/1961 | Christian | 324/228 |
| 3,149,403 | A | * | 9/1964 | Aurich et al. | 492/8 |
| 3,166,985 | A | * | 1/1965 | Stanley | 409/181 |
| 4,744,350 | A | * | 5/1988 | Sato | 601/119 |
| 5,448,803 | A | * | 9/1995 | Morell | 19/272 |
| 5,575,760 | A | * | 11/1996 | Masuda | 601/19 |
| 6,857,382 | B2 | * | 2/2005 | Perkins | 114/230.1 |
| 6,941,632 | B1 | * | 9/2005 | Mead et al. | 29/424 |
| 7,487,796 | B2 | * | 2/2009 | Imler et al. | 137/614.04 |
| 8,087,643 | B2 | * | 1/2012 | Turner | 254/134.3 FT |
| 2003/0209472 | A1 | * | 11/2003 | Hsiao | 209/215 |

FOREIGN PATENT DOCUMENTS

| | | | | | |
|---|---|---|---|---|---|
| JP | 63-292967 | * | 11/1988 | | A61N 1/00 |
| JP | 101-56036 | * | 6/1998 | | A63F 7/02 |
| JP | 10-244010 | * | 9/1998 | | A61N 2/08 |
| JP | 2009-163432 | * | 7/2009 | | A61H 23/02 |

OTHER PUBLICATIONS

Airtech Advanced Materials Group Data Sheet for Air Roller 232; Dec. 8, 2005; http://www.airtechonline.com.
Armstrong Magnetics Incorporated; Stock Sizes of Neodymium Magnets; http://www.armsmag.com/neodymium_stock_size.htm Accessed Oct. 13, 2011.

* cited by examiner

Primary Examiner — Laura M Lee
(74) Attorney, Agent, or Firm — Klintworth & Rozenblat IP LLC

(57) ABSTRACT

A roller comprising a magnet is used to apply a force to a material between the magnet of the roller and a magnetically susceptible surface. A handle of the roller may be moved by a user to roll the roller over the material to apply the force along a length of the material.

10 Claims, 5 Drawing Sheets

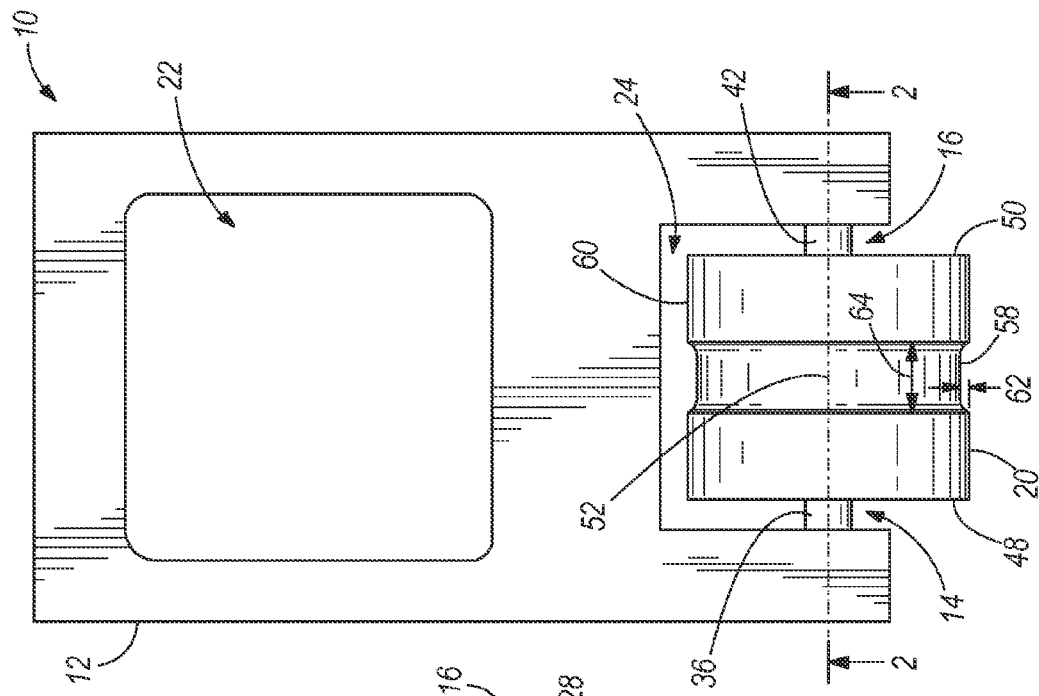
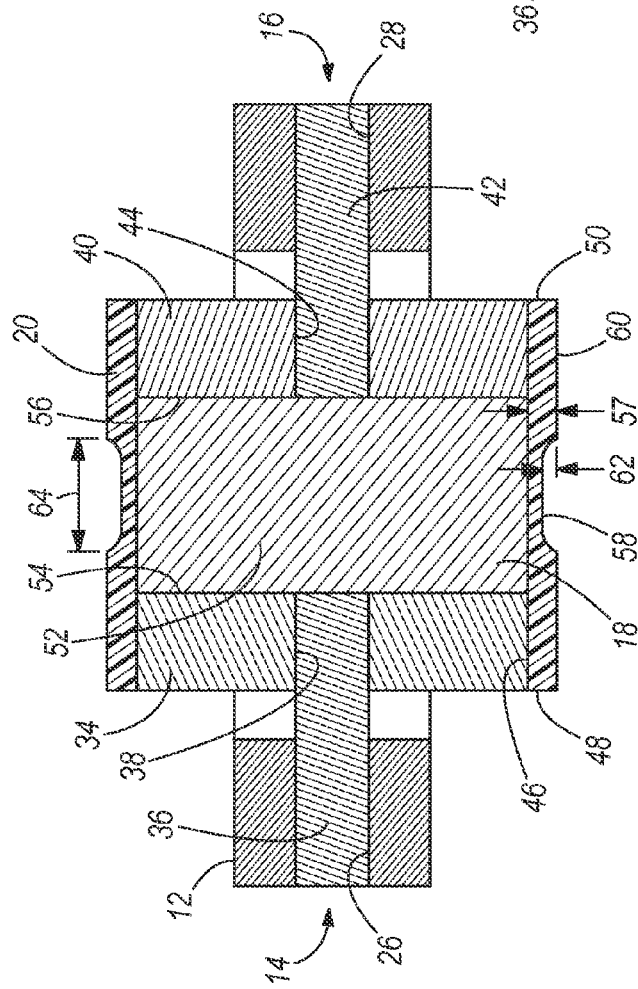

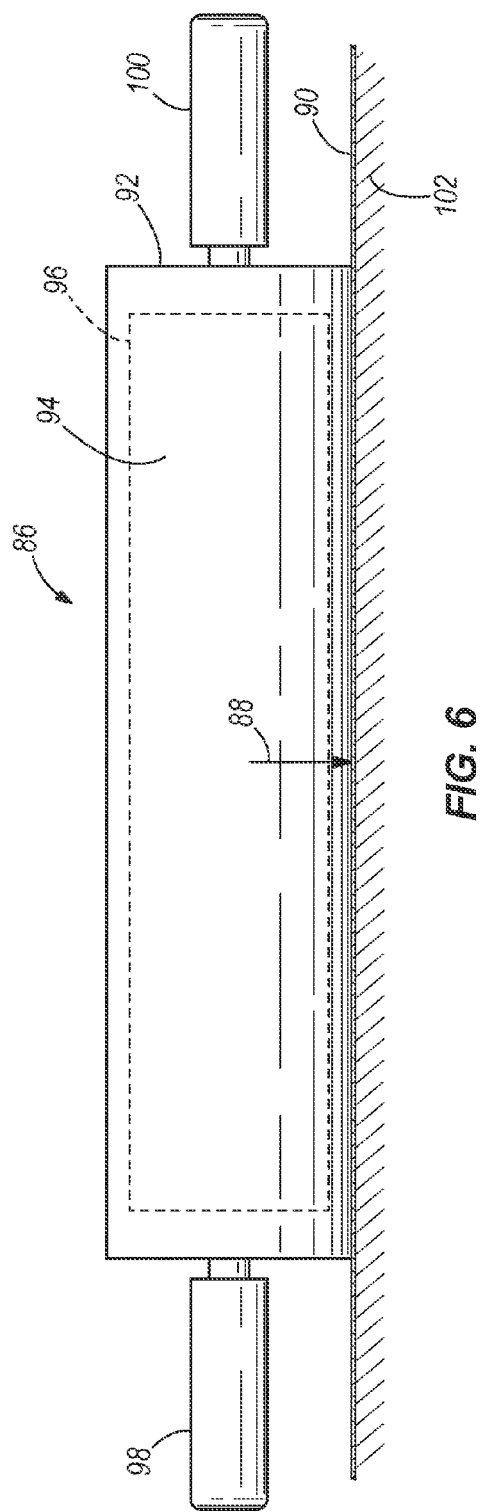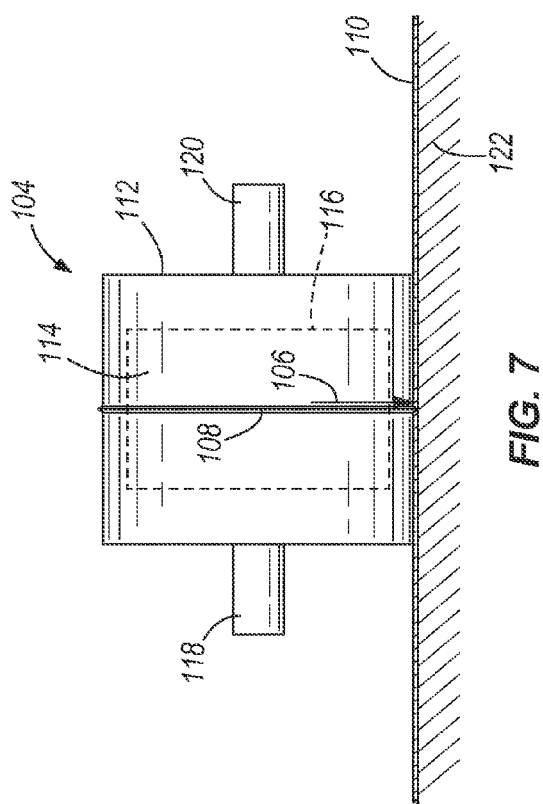

8,888,670 B2

APPARATUS AND METHOD UTILIZING A MAGNETIC FORCE TO APPLY A FORCE TO A MATERIAL

FIELD OF THE DISCLOSURE

The disclosure relates to apparatus and methods which utilize a magnetic force to apply a force, to compress, or to cut a material.

BACKGROUND OF THE DISCLOSURE

To apply a force to a material a user typically applies a force to the material using a tool. For instance, one method of compressing two-sided adhesive tape between a vacuum bag and a composite layup tool, to seal the vacuum bag to the composite layup tool, utilizes a hand-held, spatula-shaped apparatus. The user moves the hand-held, spatula-shaped apparatus over the vacuum bag applying a user-applied compressive force to force the adhesive tape to compress between the vacuum bag and the composite layup tool thereby sealing the vacuum bag to the composite layup tool. This process requires twenty-five pounds of user-applied compressive force which must be applied around the entire periphery of the composite layup tool which can be eighty-four feet. This process may require substantial time, may increase cost, may result in user-fatigue, or may result in other types of ergonomic issues.

There is a need for an apparatus and method which will resolve one or more issues of the current art.

SUMMARY OF THE DISCLOSURE

In one embodiment, a roller comprising a magnet is disclosed.

In another embodiment, an apparatus comprising a handle, a roller, and a magnet is disclosed.

In an additional embodiment, a method of applying a force to a material is disclosed. In one step, a material is disposed between an apparatus comprising a roller and a magnetically susceptible surface. The roller comprises a magnet. In another step, the roller, comprising the magnet, is rolled over the material with the material disposed between the roller, comprising the magnet, and the magnetically susceptible surface in order to apply a force to the material.

These and other features, aspects and advantages of the disclosure will become better understood with reference to the following drawings, description and claims.

BRIEF DESCRIPTION OF THE DRAWINGS

FIG. 1 illustrates a front view of one embodiment of an apparatus for applying a force;

FIG. 2 illustrates a cross-section view through line 2-2 of the apparatus of FIG. 1;

FIG. 6 illustrates a front view of another embodiment of an apparatus being used to apply a force to a material; and FIG. 7 illustrates a front view of another embodiment of an apparatus being used to apply a cutting force, applied by a cutting member, to a material.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 3:
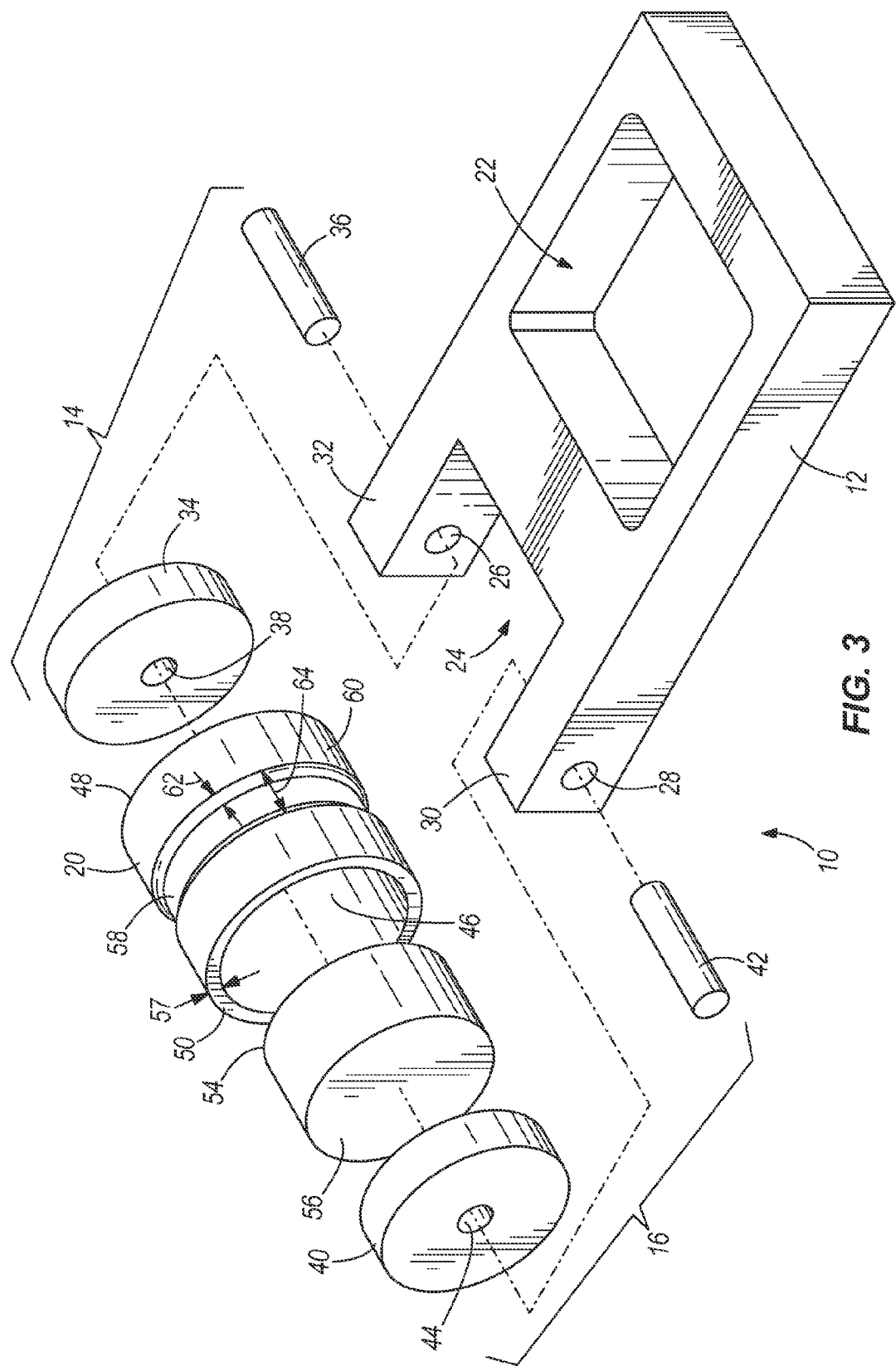
FIG. 3 illustrates a side perspective view of the apparatus of FIG. 1 in a disassembled state.

FIG. 1 illustrates a front view of one embodiment of an apparatus 10 for applying a force. FIG. 2 illustrates a cross-section view through line 2-2 of the apparatus 10 of FIG. 1. FIG. 3 illustrates a side perspective view of the apparatus 10 of FIG. 1 in a disassembled state. As shown collectively in FIGS. 1, 2, and 3, the apparatus 10 comprises a handle 12, axles 14 and 16, magnet 18, and roller 20. The handle 12 comprises a rectangular opening 22, a U-shaped opening 24, and holes 26 and 28 disposed through opposed portions 30 and 32. The rectangular opening 22 allows a user to insert the user's fingers into the rectangular opening 22 to grip the handle 12. The handle 12 is made of nylon. In other embodiments, the handle 12 may be of varying shapes, configurations, orientations, sizes, or materials.

Axle 14 comprises a hub 34 and a rod 36. The hub 34 is cylindrical with an axial bore 38 extending through the hub 34. The rod 36 has a circular cross-section. The rod 36 fits through hole 26 of the handle 12 into axial bore 38 of the hub 34 to hold the hub 34 in place within the U-shaped opening 24 of the handle 12. The hub 34 and the rod 36 are preferably made of ferromagnetic materials. In other embodiments, the hub 34 and the rod 36 may be of varying shapes, configurations, orientations, sizes, or materials.

Axle 16 comprises a hub 40 and a rod 42. The hub 40 is cylindrical with an axial bore 44 extending through the hub 40. The rod 42 has a circular cross-section. The rod 42 fits through hole 28 of the handle 12 into axial bore 44 of the hub 40 to hold the hub 40 in place within the U-shaped opening 24 of the handle 12 in opposed position to hub 34. The hub 40 and the rod 42 are preferably made of ferromagnetic materials. In other embodiments, the hub 40 and the rod 42 may be of varying shapes, configurations, orientations, sizes, or materials.

Magnet 18 is cylindrical, is a rare-earth Neodymium magnet rated at 130 to 135 pounds of attraction, and is available from Armstrong Magnetics, Inc. as part number 22049 at shown at the following link: http://www.armsmag.com/neodymium_stock_size.htm. In other embodiments, the magnet 18 may be made of varying materials such as Iron, Boron, or other types of materials. In additional embodiments, the magnet 18 may be rated to produce at least 100 pounds of attraction. In further embodiments, the magnet 18 may comprise varying types of magnets of varying quantities, shapes, configurations, orientations, sizes, materials, or strengths of the magnetic field.

Roller 20 is cylindrical. A circular cavity 46 extends between opposed ends 48 and 50 of the roller 20. The magnet 18 is fit within the circular cavity 46 of the roller 20 in the center 52 of the cavity 46 between opposed ends 48 and 50 of the roller 20 and between opposed hubs 34 and 40 of the axles 14 and 16. Hub 34 is fixed within circular cavity 46 at end 48 of the roller 20. Hub 40 is fixed within circular cavity 46 at end 50 of the roller 20. Hubs 34 and 40 are abutted against opposed surfaces 54 and 56 of the magnet 18 within the circular cavity 46 of the roller 20. In such manner, the roller 20 is held in place within the U-shaped opening 24 of the handle 12 by the attached hubs 34 and 40 which are held in place by the attached rods 36 and 42 extending through the holes 26 and 28 of the handle 12.

The roller 20 has a wall thickness 57. The wall thickness 57 may be selected to control the amount of force 63 (discussed below in FIG. 4) the magnet 18 applies to a magnetically susceptible surface 66 (discussed below in FIG. 4). The larger the wall thickness 57, the more force 63 (discussed below in FIG. 4) is applied to the magnetically susceptible surface 66 (discussed below in FIG. 4) due to the separation distance between the magnet 18 and the magnetically susceptible surface 66 (discussed below in FIG. 4) increasing. In other embodiments, other means may be used to control the separation distance between the magnet 18 and the magnetically susceptible surface 66 (see FIG. 4) such as a ratcheting mechanism to move the magnet 18 relative to the magnetically susceptible surface 66 (see FIG. 4) or other types of moving mechanisms to change their relative location.

An optional groove 58, centered at center 52 of the cavity 46, extends around an outer surface 60 of the roller 20. The groove 58 may have a depth 62 of 0.075 inches and a width 64 of 0.600 inches. The roller 20 may be non-magnetic and may be made of nylon. In other embodiments, the roller 20, including the cavity 46 and the groove 58, may be of varying shape, configuration, orientation, size, or material. In further embodiments, the apparatus 10 may be of varying shape, configuration, orientation, size, or materials. For instance, in one alternative embodiment the magnet 18 could have an axial bore extending through the magnet 18, and the rods 36 and 42 could be replaced with a single rod.

Figure 4:
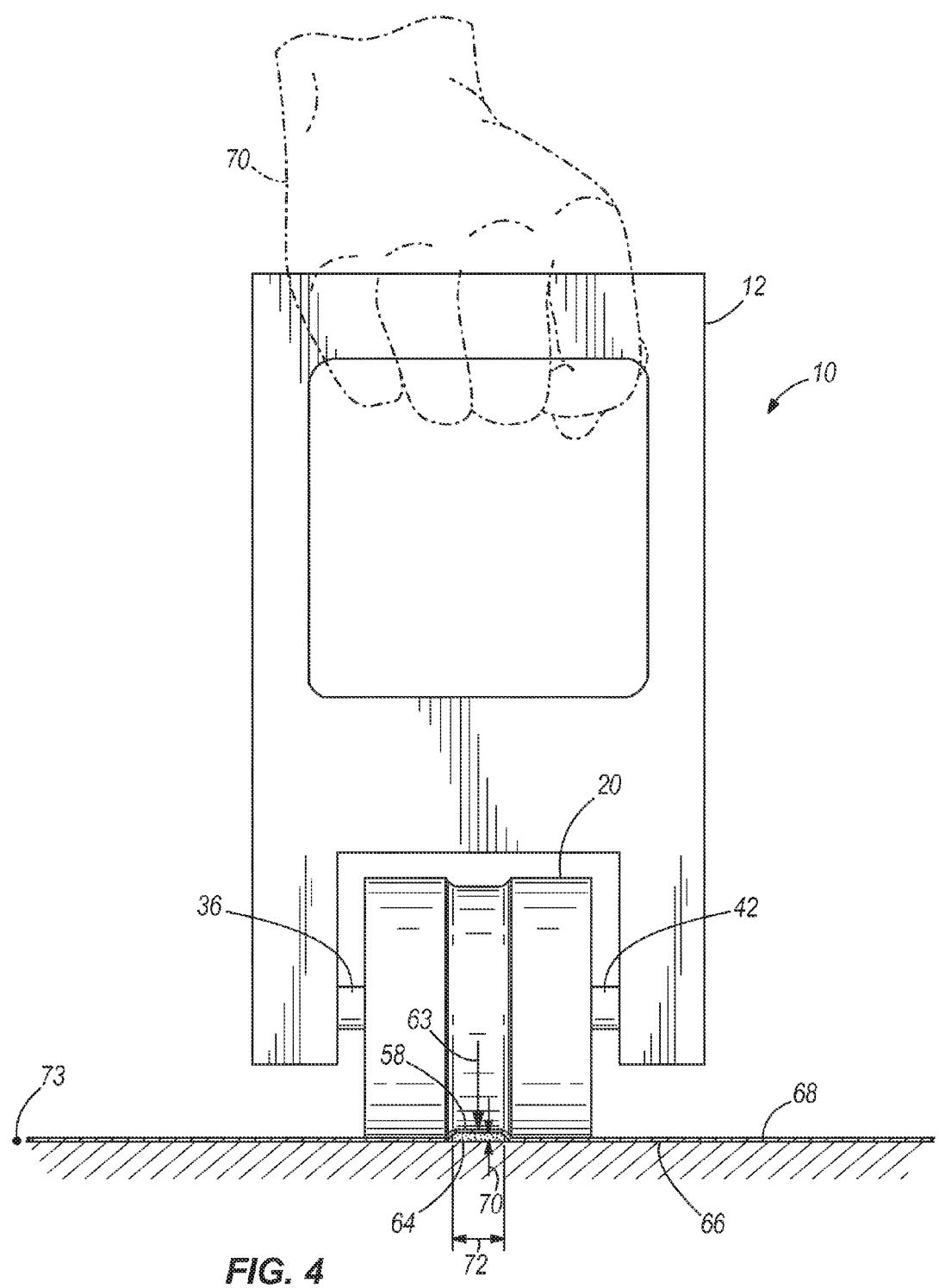
FIG. 4 illustrates a front view of the apparatus of FIG. 1 being used to apply a force to a material.

FIG. 4 illustrates a front view of the apparatus 10 of FIG. 1 being used to apply a force 63 to a material 64. The force 63 may comprise a compressive force. The material 64 comprises two-sided adhesive tape. The material 64 is disposed on and against a magnetically susceptible surface 66. The magnetically susceptible surface 66 may comprise a composite layup tool made of Invar. The magnetically susceptible surface 66 may have a non-magnetically susceptible layer or coating. Member 68 is disposed over and against material 64 and over and against magnetically susceptible surface 66 with the material 64 being disposed between the magnetically susceptible surface 66 and member 68. Member 68 comprises a vacuum bag. The roller 20 is disposed against member 68 over each of member 68, material 64, and magnetically susceptible surface 66. The material 64 is disposed partially within groove 58 of the roller 20. The material 64 has a depth 70 of 0.250 inches and a width 72 of 0.500 inches. The groove 58 helps a user 70, gripping the handle 12 of the apparatus 10 and moving the apparatus 10 to rotate/roll the roller 20 over a length 73 (aligned perpendicular to the page) of the member 68, the material 64, and the magnetically susceptible surface 66, keep the roller 20 aligned on the material 64 to apply the force 63 to the member 68, material 64, and magnetically susceptible surface 66.

As the roller 20 rotates against the member 68 over the member 68, the material 64, and the magnetically susceptible surface 66, the magnet 18 (see FIG. 2), which is centered within the cavity 46 (see FIG. 2) of the roller 20, attracts the magnetically susceptible surface 66 towards the magnet 18 (see FIG. 2) as a result of the magnetic field of the magnet 18 (see FIG. 2). The magnetic hubs 34 and 40 (see FIG. 2) and magnetic rods 36 and 42 of the magnetic axles 14 and 16 (see FIG. 2) may act with the magnet 18 (see FIG. 2) to help direct the magnetic field. This magnetic force compresses the material 64 between the member 68 and the magnetically susceptible surface 66 to adhere the material 64 to both the member 68 and the magnetically susceptible surface 66 thereby sealing the member 68 to the magnetically susceptible surface 66.

Due to the magnetic force, the user 70 only needs to apply five pounds of force to move/push/pull the roller 20 over the member 68, the material 64, and the magnetically susceptible surface 66 to compress the material 64 between the member 68 and the magnetically susceptible surface 66. The five pounds of force required by the user 70 with the magnetic force of the apparatus 10 is eighty percent less than the force which the user 70 would need to apply without the magnetic force of the apparatus 10. In other embodiments, the apparatus 10 may apply varying magnetic forces with the user 70 applying varying corresponding user-applied forces to compress the material 64 between the member 68 and the magnetically susceptible surface 66. In still other embodiments, the material 64, magnetically susceptible surface 66, and member 68 may vary in type, shape, configuration, orientation, size, or material.

Figure 5:
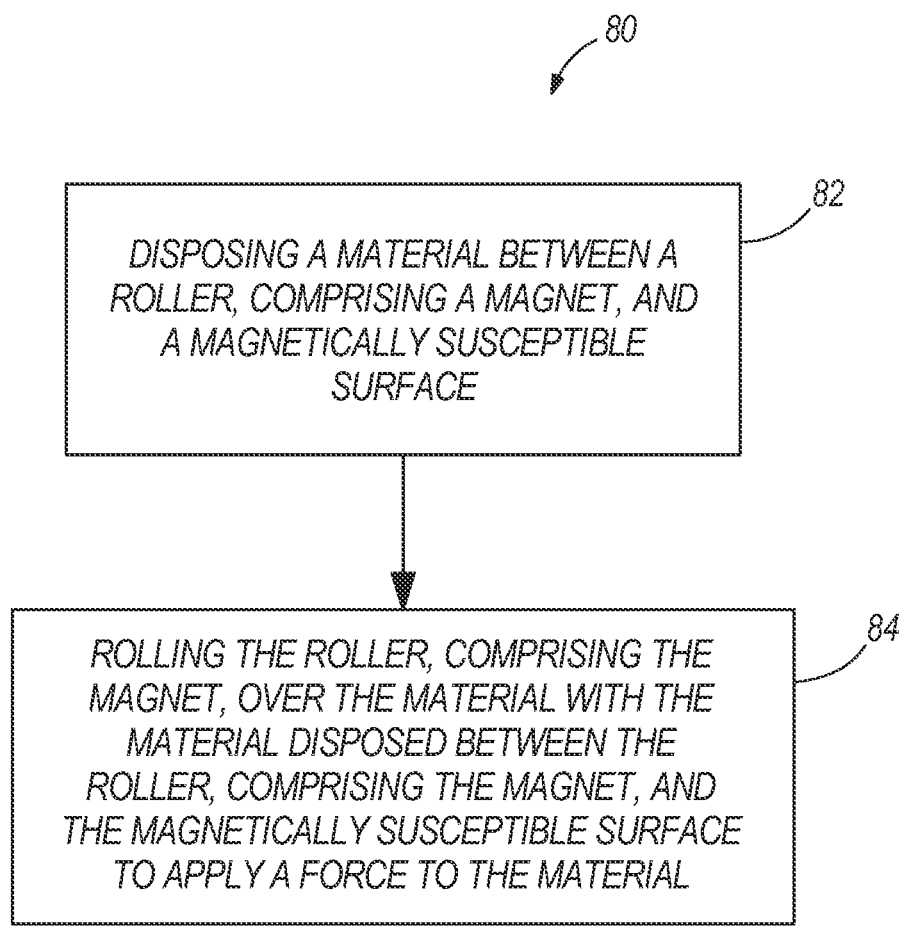
FIG. 5 illustrates a flowchart showing one embodiment of a method of applying a force to a material.

FIG. 5 illustrates a flowchart showing one embodiment of a method 80 of applying a force to a material. In step 82, a material is disposed between a roller, comprising a magnet, and a magnetically susceptible surface. The material may comprise tape or another type of material. The magnetically susceptible surface may comprise a composite layup tool or another type of surface. In one embodiment, step 82 may further comprise aligning the material within a groove of the roller. In step 84, the roller, comprising the magnet, is rolled over the material with the material disposed between the roller, comprising the magnet, and the magnetically susceptible in order to apply a force to the material. The applied force may comprise a compressive force, a cutting force, or another type of force. In one embodiment, step 84 may further comprise moving/pushing the roller with a handle to roll the roller over the material.

In another embodiment, step 82 may comprise disposing tape between a vacuum bag and a composite layup tool, and step 84 may comprise rolling the roller, comprising the magnet, over the vacuum bag, the tape, and the composite layup tool to seal the vacuum bag to the composite layup tool with the tape. In still another embodiment, an additional step may comprise cutting the material with a cutting member of the apparatus.

FIG. 6 illustrates a front view of another embodiment of an apparatus 86 being used to apply a force 88 to a material 90. The force may comprise a compressive force. The apparatus 86 comprises a roller 92 with a magnet 94 disposed within a cavity 96 of the roller 92. The apparatus 86 optionally comprises opposed handles 98 and 100 for rolling the roller 92 over the material 90 disposed on a magnetically susceptible surface 102. The attraction of the magnetically susceptible surface 102 to the magnet 94 causes the roller 92 to apply the force 88 to the material 90. In one embodiment, the apparatus 86 may comprise a kitchen rolling pin to roll out a material 90 such as dough on a magnetically susceptible surface 102 comprising a bread board. In other embodiments, the apparatus 86 and the magnetically susceptible surface 102 may be used to apply forces to differing types of material to serve differing functions.

FIG. 7 illustrates a front view of another embodiment of an apparatus 104 being used to apply a cutting force 106, applied by a cutting member 108, to a material 110. The apparatus 104 comprises a roller 112 with a magnet 114 disposed within a cavity 116 of the roller 112. The cutting member 108 is attached to the roller 112 and may comprise any number of blades or other types of cutting members. The apparatus 104 optionally comprises opposed handles 118 and 120 for rolling the roller 112 over the material 110 disposed on a magnetically susceptible surface 122. The attraction of the magnetically susceptible surface 122 to the magnet 114 causes the roller 112 to apply the cutting force 106 to the material 110. The apparatus 104 may be used to cut any type of material 110. In other embodiments, the apparatus 104, including the cutting member 108, and the magnetically susceptible surface 122 may vary in number, shape, size, configuration, orientation, or materials. For instance, in one embodiment, the cutting member 108 may vary in quantity and be attached to any portion of the apparatus 104 such as to any portion of the roller 112 or to any portion of the handles 118 and 120. In still other embodiments, the apparatus 104 and the magnetically susceptible surface 122 may be used for differing functions.

One or more embodiments of the disclosure may reduce or eliminate one or more issues experienced by current apparatus for applying forces to materials. For instance, one or more embodiments of the disclosure may save time, may save cost, may reduce user-fatigue, or may result in other types of ergonomic advantages.

It should be understood, of course, that the foregoing relates to exemplary embodiments of the disclosure and that modifications may be made without departing from the spirit and scope of the disclosure as set forth in the following claims.

I claim:

1. An apparatus comprising:
    a handle;
    a roller comprising an open groove extending within and around an outer surface of the roller;
    at least one axle attaching the roller to the handle so that the roller is configured to rotate relative to the handle; and
    a magnet attached to the roller, wherein the magnet is aligned directly under the open groove with the magnet rated to produce at least 100 pounds of attraction into the open groove.

2. The apparatus of claim 1 wherein the roller is made of a non-magnetic material.

3. The apparatus of claim 1 wherein the roller comprises a cavity and the magnet is disposed within the cavity.

4. The apparatus of claim 1 wherein the roller is cylindrical.

5. The apparatus of claim 1 further comprising opposed axles attaching opposed ends of the roller to opposed portions of the handle, wherein the magnet is disposed within a cavity of the roller between the opposed axles.

6. The apparatus of claim 1 wherein the groove is U-shaped.

7. The apparatus of claim 1 wherein the groove comprises a bottom surface which is disposed parallel to the outer surface of the roller, and two opposed side surfaces extending between the bottom surface of the groove and the outer surface of the roller.

8. The apparatus of claim 1 wherein the groove is cut into the outer surface of the roller.

9. The apparatus of claim 1 wherein the roller comprises only one groove extending around the outer surface of the roller.

10. The apparatus of claim 1 wherein the groove is disposed in a center of the roller.

* * * * *